US012626375B2

(12) United States Patent
Nakano

(10) Patent No.: US 12,626,375 B2
(45) **Date of Patent: \*May 12, 2026**

(54) HOMOGRAPHY MATRIX GENERATION APPARATUS, CONTROL METHOD, AND COMPUTER-READABLE MEDIUM

(71) Applicant: NEC Corporation, Tokyo (JP)

(72) Inventor: Gaku Nakano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 407 days.

This patent is subject to a terminal disclaimer.

(21) Appl. No.: 18/034,833

(22) PCT Filed: Nov. 10, 2020

(86) PCT No.: PCT/JP2020/041962
§ 371 (c)(1),
(2) Date: May 1, 2023

(87) PCT Pub. No.: WO2022/101998
PCT Pub. Date: May 19, 2022

(65) Prior Publication Data
US 2023/0419515 A1 Dec. 28, 2023

(51) Int. Cl.
*G06T 7/33* (2017.01)

(52) U.S. Cl.
CPC ...... *G06T 7/33* (2017.01); *G06T 2207/10016* (2013.01)

(58) Field of Classification Search
None
See application file for complete search history.

(56) References Cited

U.S. PATENT DOCUMENTS 8,401,342 B2 * 3/2013 Ruzon .................. G06V 10/757
707/706
2006/0026646 A1 * 2/2006 Lou ...................... G11B 27/105
725/135

(Continued)

FOREIGN PATENT DOCUMENTS

JP 2015-138413 A 7/2015
JP 2015-233212 A 12/2015

(Continued)

OTHER PUBLICATIONS

Li, Z.Y., Song, L.M., Xi, J.T., Guo, Q.H., Zhu, X.J. and Chen, M.L., 2015. A stereo matching algorithm based on SIFT feature and homography matrix. Optoelectronics letters, 11(5), pp. 390-394. (Year: 2015).*

(Continued)

*Primary Examiner* — Michelle M Entezari Hausmann

(74) *Attorney, Agent, or Firm* — Sughrue Mion, PLLC

(57) ABSTRACT

A homography matrix generation apparatus (2000) detects two or more key-point pairs from a first image (10) and a second image (20). The homography matrix generation apparatus (2000) detects, for each of the key-point pairs, a derived point pair, which is a pair of a point separated by a first distance in a first direction from a point on the first image (10) included in the key-point pair and a point separated by a second distance in a second direction from a point on the second image (20) included in the key-point pair. The homography matrix generation apparatus (2000) uses each of the detected key-point pairs and the derived point pairs to generate a homography matrix (40) representing a homography from a point on the first image (10) to a point on the second image (20).

12 Claims, 7 Drawing Sheets

(56) References Cited

U.S. PATENT DOCUMENTS

| | | | | |
|---|---|---|---|---|
| 2008/0137940 | A1 | 6/2008 | Kakinami et al. | |
| 2016/0117828 | A1* | 4/2016 | Choi | G06T 7/74 |
| | | | | 382/103 |
| 2016/0150211 | A1 | 5/2016 | Hwang et al. | |
| 2016/0371817 | A1 | 12/2016 | Matsubara | |
| 2020/0357158 | A1* | 11/2020 | Zhang | G06F 3/147 |
| 2021/0312661 | A1* | 10/2021 | Kojima | G06V 20/56 |
| 2022/0108544 | A1* | 4/2022 | Becker | G06V 10/806 |
| 2024/0127416 | A1* | 4/2024 | Schmidt | G06N 3/045 |
| 2024/0135674 | A1 | 4/2024 | Nakano | |
| 2024/0153233 | A1 | 5/2024 | Nakano | |

FOREIGN PATENT DOCUMENTS

| | | |
|---|---|---|
| JP | 2016-100899 A | 5/2016 |
| JP | 2017-011431 A | 1/2017 |
| JP | 2017-174105 A | 9/2017 |
| JP | 2020-057182 A | 4/2020 |

OTHER PUBLICATIONS

Ding T, Yang Y, Zhu Z, Robinson DP, Vidal R, Kneip L, Tsakiris MC. Robust homography estimation via dual principal component pursuit. InProceedings of the IEEE/CVF Conference on Computer Vision and Pattern Recognition 2020 (pp. 6080-6089). (Year: 2020).*

Vincent, Etienne, and Robert Laganiére. "Detecting planar homographies in an image pair." Proceedings of the 2nd International Symposium on Image and Signal Processing and Analysis. In conjunction with 23rd International Conference on Information Technology Interfaces (IEEE Cat . . . IEEE, 2001. (Year: 2001).*

Yan, Qing, et al. "HEASK: Robust homography estimation based on appearance similarity and keypoint correspondences." Pattern Recognition 47.1 (2014): 368-387. (Year: 2014).*

Cai, Shen, et al. "Fast and interpretable 2d homography decomposition: Similarity-kernel-similarity and affine-core-affine transformations." IEEE Transactions on Pattern Analysis and Machine Intelligence (2025). (Year: 2025).*

International Search Report for PCT Application No. PCT/JP2020/041962, mailed on Jan. 26, 2021.

D. Barath and Z. Kukelova, "Homography from two orientation- and scale-covariant features", Computer Research Repository, arXiv:1906.11927, Jun. 27, 2019.

David Nister, "An Efficient Solution to the Five-Point Relative Pose Problem", IEEE transactions on pattern analysis and machine intelligence, Apr. 19, 2004, vol. 26, Issue 6, pp. 756-770.

Carlo Tomasi, "The Eight-Point Algorithm", 2015, Duke University, <URL: https://www2.cs.duke.edu/courses/fall15/compsci527/notes/longuet-higgins.pdf>, (1) 2_1.

Carlo Tomasi, "The Eight-Point Algorithm", 2015, Duke University, <URL: https://www2.cs.duke.edu/courses/fall15/compsci527/notes/longuet-higgins.pdf>, (1) 2_2.

Daniel Barath et al., "Efficient Recovery of Essential Matrix from Two Affine Correspondences", IEEE Transactions on Image Processing, Jun. 22, 2018, vol. 27, Issue 11.

International Search Report for PCT Application No. PCT/JP2021/008289, mailed on Apr. 27, 2021.

R. Hartley and A. Zisserman, "Multiple view geometry in computer vision 2nd edition", Cambridge University Press, Mar. 25, 2004, pp. 279-282.

H. Stewenius, Three others, "A minimal solution for relative pose with unknown focal length", Image and Vision Computing, Jul. 2008, vol. 26, issue 7, pp. 871-877.

F. Jiang, Three others, "A minimal solution to relative pose with unknown focal length and radial distortion", Springer, Asian Conference on Computer Vision, Nov. 1, 2014, pp. 443-456.

D. Barath, Two others, "A minimal solution for two-view focal length estimation using two affine correspondences", Computer Research Repository, arXiv:1706.01649, Jun. 6, 2017.

International Search Report for PCT Application No. PCT/JP2021/009391, mailed on Apr. 27, 2021.

US Office Action for U.S. Appl. No. 18/280,415, mailed on Sep. 8, 2025.

Whitehead et al., "Intrinsic Camera Parameters", 2004 (Year: 2004).

* cited by examiner

HOMOGRAPHY MATRIX GENERATION APPARATUS, CONTROL METHOD, AND COMPUTER-READABLE MEDIUM

This application is a National Stage Entry of PCT/JP2020/041962 filed on Nov. 10, 2020, the contents of all of which are incorporated herein by reference, in their entirety.

TECHNICAL FIELD

The present disclosure relates to generation of a homography matrix.

BACKGROUND ART

Techniques for generating a homography matrix representing a homography from a point on one image to a point on another image have been developed. For example, Patent Literature 1 discloses a technique for generating a homography matrix for acquiring, from an image obtained by photographing the subject at an oblique angle, a bird's-eye-view image in which a subject is viewed from vertically above. In Patent Literature 1, four or more pairs of key-points corresponding to each other are detected from two images to generate a homography matrix from the set of the detected key-point pairs using a robust estimation algorithm, such as random sample consensus (RANSAC).

CITATION LIST

Patent Literature

Patent Literature 1: Japanese Unexamined Patent Application Publication No. 2015-233212

Non Patent Literature

Non Patent Literature 1: D. Barath and Z. Kukelova, "Homography from two orientation- and scale-covariant features", Computer Research Repository, arXiv:1906.11927, Jun. 27, 2019.

SUMMARY OF INVENTION

Technical Problem

The inventor has studied a new technique for generating a homography matrix. A purpose of the present disclosure is to provide a new technique for generating a homography matrix.

Solution to Problem

A homography matrix generation apparatus according to the present disclosure includes: a first detecting unit configured to detect, from a first image and a second image, two or more key-point pairs each of which is a pair of key-points corresponding to each other; a second detecting unit configured to detect, for each of the key-point pairs, a derived point pair that is a pair of a point separated by a first distance in a first direction from a point on the first image included in the key-point pair and a point separated by a second distance in a second direction from a point on the second image included in the key-point pair; and a generating unit configured to generate a homography matrix representing a homography from a point on the first image to a point on the second image using each of the detected key-point pairs and the derived point pairs. The first direction and the first distance are determined based on a feature computed for the point on the first image included in the key-point pair. The second direction and the second distance are determined based on a feature computed for the point on the second image included in the key-point pair.

A control method according to the present disclosure is to be executed by a computer. The control method includes: a first detection step of detecting, from a first image and a second image, two or more key-point pairs each of which is a pair of key-points corresponding to each other; a second detection step of detecting, for each of the key-point pairs, a derived point pair that is a pair of a point separated by a first distance in a first direction from a point on the first image included in the key-point pair and a point separated by a second distance in a second direction from a point on the second image included in the key-point pair; and a generation step of generating a homography matrix representing a homography from a point on the first image to a point on the second image using each of the detected key-point pairs and the derived point pairs. The first direction and the first distance are determined based on a feature computed for the point on the first image included in the key-point pair. The second direction and the second distance are determined based on a feature computed for the point on the second image included in the key-point pair.

A computer-readable medium according to the present disclosure stores a program that causes a computer to execute the control method according to the present disclosure.

Advantageous Effects of Invention

According to the present disclosure, a new technique for generating a homography matrix is provided.

EXAMPLE EMBODIMENT

Specific example embodiments will be described hereinafter in detail with reference to the drawings. The same or corresponding elements are denoted by the same reference signs throughout the drawings, and duplicated explanations are omitted as necessary for the sake of clarity. Unless otherwise explained, predetermined values, such as specified values and thresholds, are stored in advance in a storage device or the like that can be accessed by apparatuses that use the values.

Figure 1:
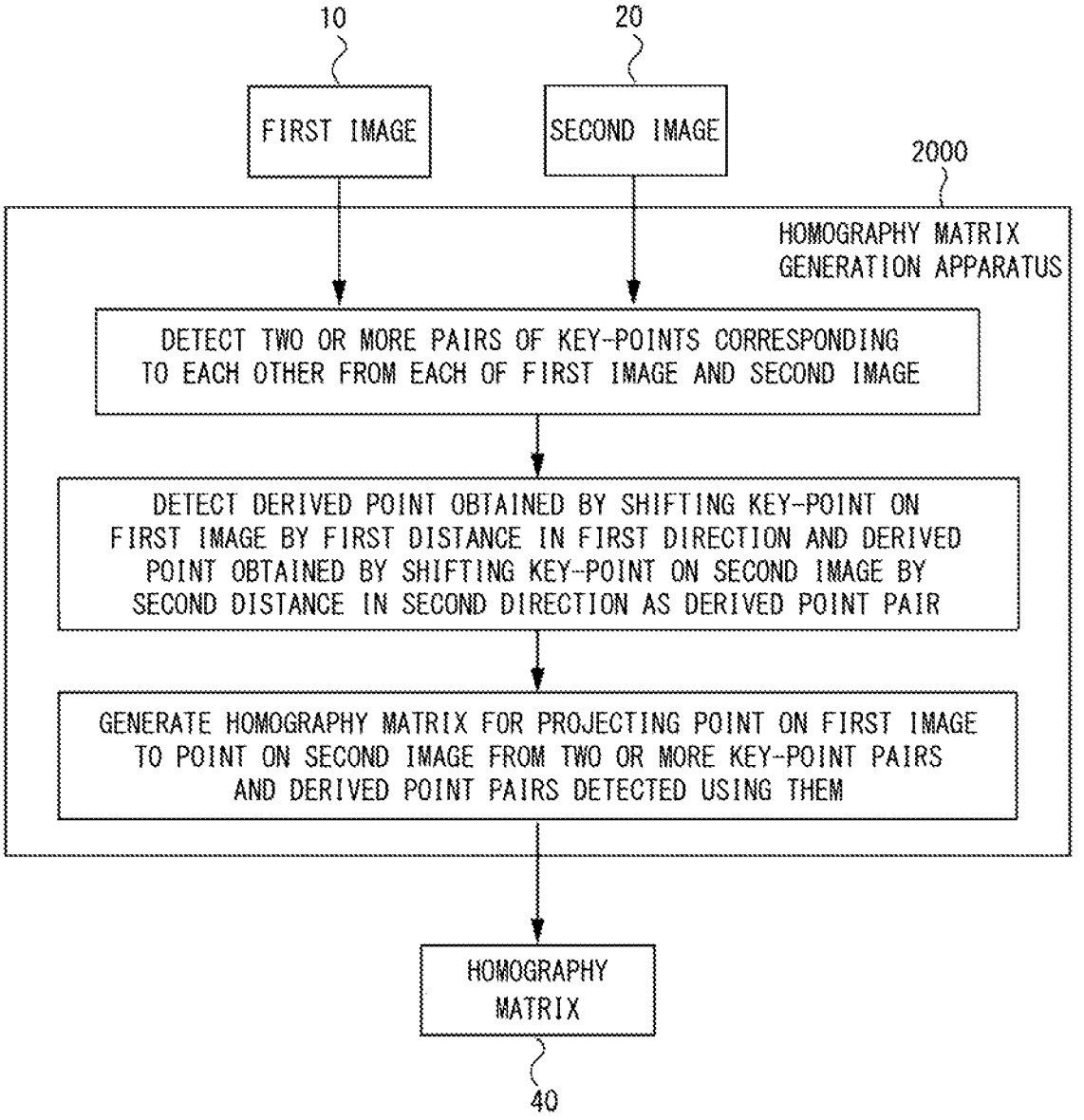
FIG. 1 is a diagram showing an example of an overview of the operation of a homography matrix generation apparatus according to a first example embodiment.

FIG. 1 is a diagram showing an example of an overview of the operation of a homography matrix generation apparatus 2000 according to a first example embodiment. Here, FIG. 1 is intended to facilitate an understanding the overview of the homography matrix generation apparatus 2000, and the operation of the homography matrix generation apparatus 2000 is not limited to that shown in FIG. 1.

The homography matrix generation apparatus 2000 acquires a first image and a second image 20, and generates a homography matrix 40, which is a matrix for a projective transformation from a point on the first image 10 to a point on the second image 20. The homography matrix 40 is represented by, for example, the following Expression (1).

[Expression 1]

$$n \sim Hm \qquad (1)$$

In the expression, a point m is a point on the first image 10, and H is the homography matrix 40, whose size is 3×3. A point n is a point obtained by projecting the point m onto the second image 20 using the matrix H. The symbol "~" indicates that the left-hand side is equal to a constant multiple of the right-hand side. Note that both points m and n are represented in 3×1 homogeneous coordinates.

The homography matrix generation apparatus 2000 generates four or more pairs of points that correspond to each other between the first image 10 and the second image 20 (corresponding points) in order to compute the homography matrix 40. Hereafter, a pair of corresponding points is referred to as a corresponding point pair. Here, a point on the first image 10 and a point on the second image 20 included in a corresponding point pair are points that represent the same position in real space as each other.

The homography matrix generation apparatus 2000 detects a corresponding point pair in the following method. First, the homography matrix generation apparatus 2000 detects a pair of key-points (a key-point pair) that correspond to each other from key-points detected from the first image 10 and key-points detected from the second image 20. That is, a key-point on the first image 10 and a key-point on the second image 20 corresponding thereto are detected as a key-point pair. Here, at least two key-point pairs are detected as corresponding point pairs to be used to generate the homography matrix 40.

The homography matrix generation apparatus 2000 uses the key-point pairs detected by the above method to further detect the corresponding point pairs. Specifically, the homography matrix generation apparatus 2000 detects a pair of: a derived point separated by a first distance in a first direction from the key-point on the first image 10 included in a key-point pair; and a derived point separated by a second distance in a second direction from the key-point on the second image 20 included in that key-point pair. The pair of the derived points detected in this manner is hereinafter also referred to as a derived point pair.

The first direction, the first distance, the second direction, and the second distance are determined using features computed for key-points. For example, features that are invariant with respect to the scale and principal axis direction, such as SIFT, (hereinafter referred to as scale-invariant features) are assumed to be used as features. In this case, the principal axis direction determined based on the features computed for the key-point on the first image 10 is used as the first direction, for example. Similarly, the principal axis direction determined based on the features computed for the key-point on the second image 20 is used as the second direction, for example. As the first distance, the scale size determined based on the feature computed for the key-point on the first image 10 is used, for example. Similarly, the scale size determined based on the feature computed for the key-point on the second image 20 is used as the second distance, for example.

Figure 2:
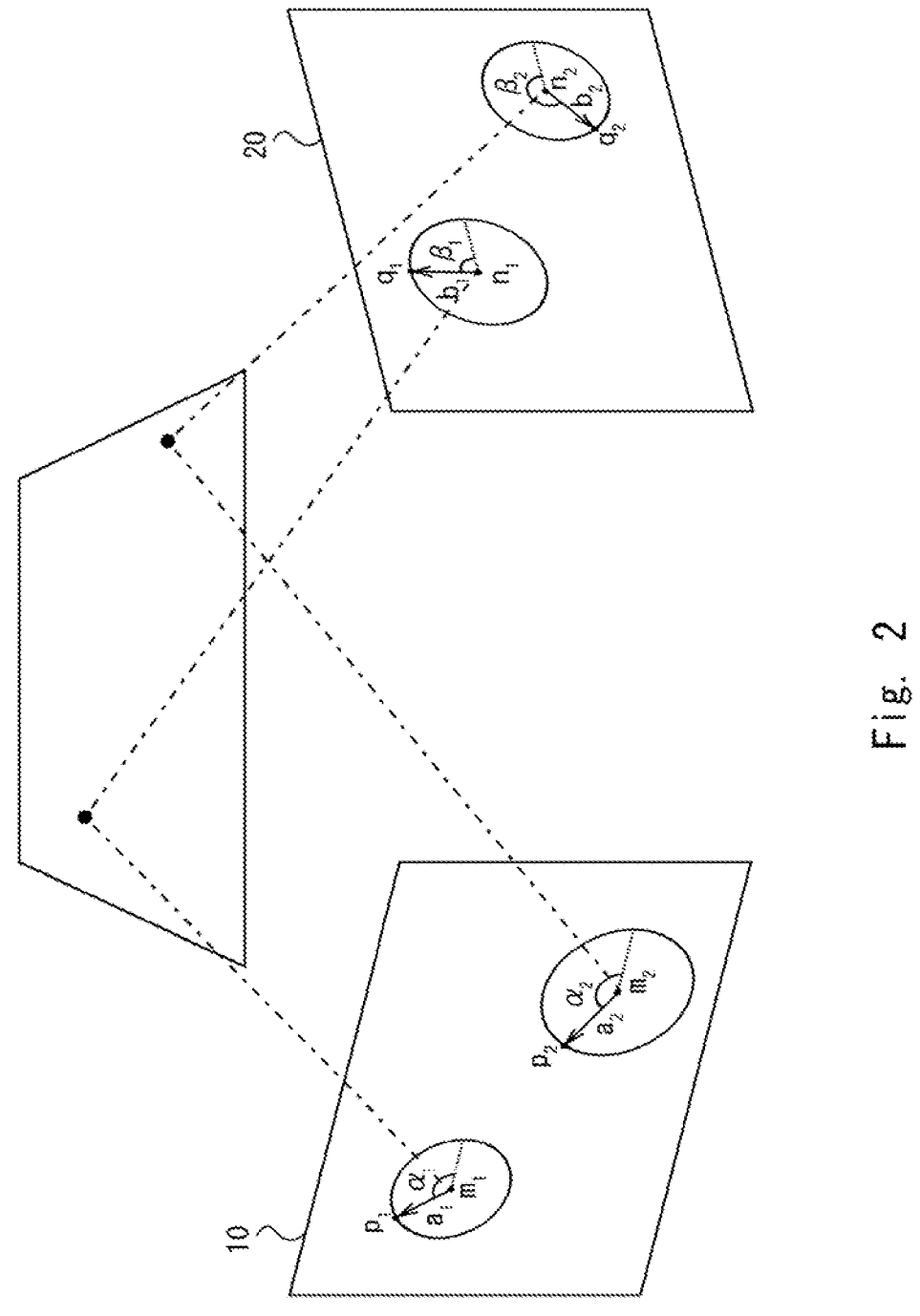
FIG. 2 is a diagram showing examples of a key-point pair and a derived point pair.

FIG. 2 is a diagram showing examples of a key-point pair and a derived point pair. In the example in FIG. 2, (m1, n1) and (m2, n2) are detected as the key-point pairs. Here, m1 and m2 are key-points on the first image 10, and n1 and n2 are key-points on the second image 20. In addition, a scale a1 and a principal axis direction α1 have been determined based on the scale-invariant feature computed for the key-point m1. Similarly, a scale b1 and a principal axis direction β1 have been determined based on the scale-invariant feature computed for the key-point n1. In this example, the direction is represented by an angle with the horizontal right direction of the image as a standard (0 degrees).

The homography matrix generation apparatus 2000 detects, for the feature point m1, a derived point p1 by shifting it by a1 in the principal axis direction α1 of the feature thereof. The homography matrix generation apparatus 2000 further detects, for the feature point n1, a derived point q1 by shifting it by b1 in the principal axis direction β1 of the feature thereof. As a result, a pair (p1, q1) of the derived point p1 and the derived point q1 is detected as a derived point pair. The derived point p1 can also be expressed as a point in the principal axis direction on the circumference of a circle that has radius a1 and is centered at the key-point m1. The same applies to the derived point q1.

In a similar manner, the homography matrix generation apparatus 2000 detects a derived point p2 by shifting it by α2 in a principal axis direction α2 of the feature thereof. The homography matrix generation apparatus 2000 further detects, for the key-point n2 on the second image 20, a derived point q2 by shifting it by b2 in a principal axis direction β2 of the feature thereof. As a result, a derived point pair (p2, q2) is detected.

The homography matrix generation apparatus 2000 uses the detected four or more corresponding point pairs (two or more key-point pairs, and the derived point pairs detected using those key-point pairs) to generate the homography matrix 40.

<Examples of Advantageous Effects>

In the invention disclosed in Patent Literature 1, four or more pairs of key-points in a representative image and a dependent image (corresponding to the first image 10 and the second image 20 in the present disclosure) are used to generate the homography matrix 40. In contrast, the homography matrix generation apparatus 2000 in the present example embodiment can generate the homography matrix 40 if there are four or more key-point pairs and derived point pairs in total. Therefore, the minimum number of key-point pairs that need to be detected from an image is two. Accordingly, the present example embodiment has an advantage in that fewer key-point pairs need to be detected from an image, compared with the invention disclosed in Patent Literature 1.

The following is a more detailed description of the homography matrix generation apparatus 2000 according to the present example embodiment.

<Example of Functional Configuration>

Figure 3:
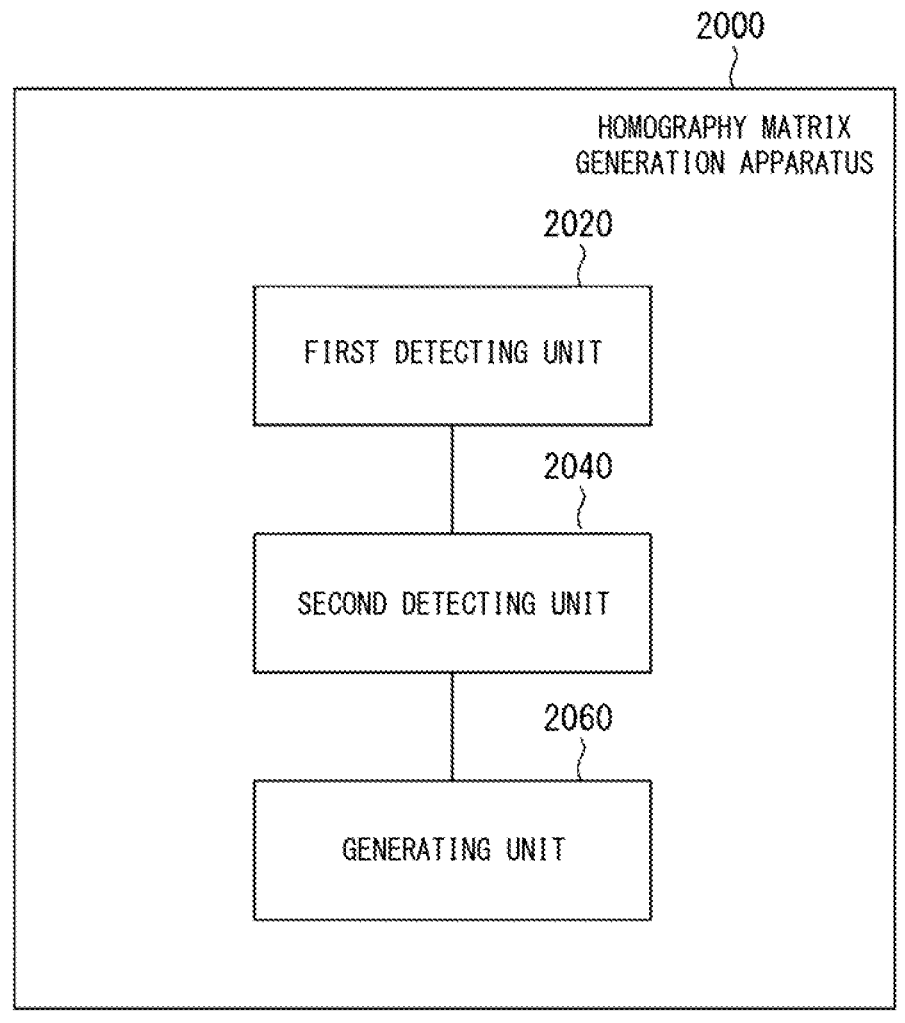
FIG. 3 is a block diagram showing an example of a functional configuration of the homography matrix generation apparatus according to the first example embodiment.

FIG. 3 is a block diagram showing an example of a functional configuration of the homography matrix generation apparatus 2000 according to the first example embodiment. The homography matrix generation apparatus 2000 includes a first detecting unit 2020, a second detecting unit 2040, and a generating unit 2060. The first detecting unit 2020 detects two or more key-point pairs from the first image 10 and the second image 20. The second detecting unit 2040 detects two or more derived point pairs from the first image and the second image 20 using the two or more key-point pairs. The generating unit 2060 generates the homography matrix 40 using the detected key-point pairs and derived point pairs.

<Example of Hardware Configuration>

Each functional component of the homography matrix generation apparatus 2000 may be implemented by hardware (for example, a hardwired electronic circuit or the like) that implements each functional component or by a combination of hardware and software (for example, a combination of an electronic circuit and a program that controls the electronic circuit). In the following, a case where each functional component of the homography matrix generation apparatus 2000 is implemented by a combination of hardware and software is further described.

Figure 4:
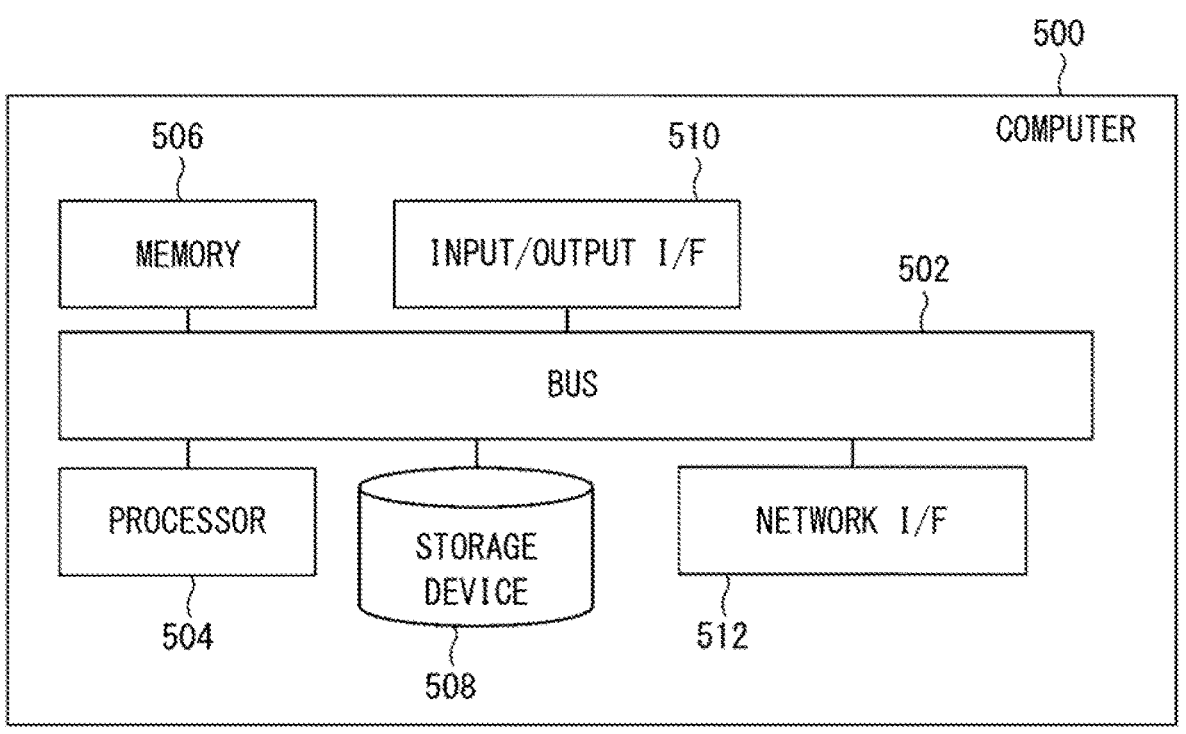
FIG. 4 is a block diagram showing an example of a hardware configuration of a computer that implements the homography matrix generation apparatus.
Figure 5:
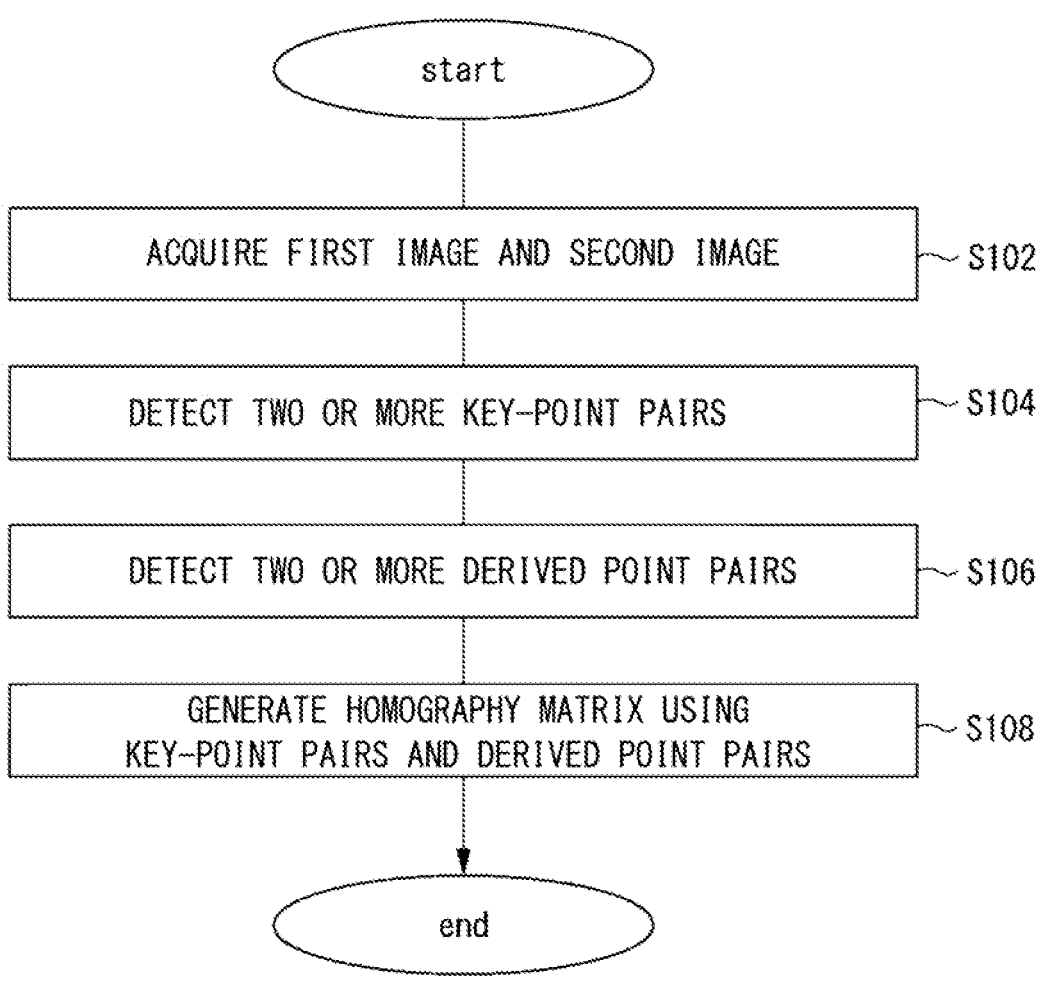
FIG. 5 is a flowchart showing an example of a flow of processing performed by the homography matrix generation apparatus according to the first example embodiment.

FIG. 4 is a block diagram showing an example of the hardware configuration of a computer 500 that implements the homography matrix generation apparatus 2000. The computer 500 is any computer. For example, the computer 500 is a stationary computer, such as a personal computer (PC) or a server machine. Alternatively, the computer 500 is a portable computer, such as a smartphone or a tablet device. The computer 500 may be a special-purpose computer designed to implement the homography matrix generation apparatus 2000 or may be a general-purpose computer.

For example, by installing a predetermined application on the computer 500, each function of the homography matrix generation apparatus 2000 is implemented on the computer 500. The application includes a program to implement the functional components of the homography matrix generation apparatus 2000. Note that the program is acquired by any method. For example, the program can be acquired from a storage medium (a DVD disk, a USB memory, or the like) storing the program. Alternatively, the program can be acquired by, for example, downloading the program from a server apparatus that manages a storage device storing the program.

The computer 500 includes a bus 502, a processor 504, a memory 506, a storage device 508, an input/output interface 510, and a network interface 512. The bus 502 is a data transmission path for the processor 504, the memory 506, the storage device 508, the input/output interface 510, and the network interface 512 to transmit and receive data to and from each other. However, the method of connecting the processor 504 and other apparatuses to each other is not limited to the bus connection.

The processor 504 is a processor of various types, such as a central processing unit (CPU), a graphics processing unit (GPU), or a field-programmable gate array (FPGA). The memory 506 is a primary storage device implemented using a random access memory (RAM) or the like. The storage device 508 is a secondary storage device implemented using a hard disk, a solid state drive (SSD), a memory card, or a read only memory (ROM).

The input/output interface 510 is an interface for connecting the computer 500 to input/output devices. For example, input devices, such as a keyboard, and an output device, such as a display device, are connected to the input/output interface 510.

The network interface 512 is an interface for connecting the computer 500 to a network. This network may be a local area network (LAN) or a wide area network (WAN).

The storage device 508 stores a program that implements each functional component of the homography matrix generation apparatus 2000 (the program that implements the above application). The processor 504 loads the program into the memory 506 and executes it to implement each functional component of the homography matrix generation apparatus 2000.

The homography matrix generation apparatus 2000 may be implemented on one computer 500 or on a plurality of computers 500. In the latter case, the configuration of each computer 500 does not need to be the same and can be different.

<Flow of Processing>

FIG. 4 is a flowchart showing a flow of processing performed by the homography matrix generation apparatus 2000 according to the first example embodiment. The first detecting unit 2020 acquires a first image 10 and a second image 20 (S102). The first detecting unit 2020 detects two or more key-point pairs using the first image 10 and the second image 20 (S104). The second detecting unit 2040 detects a derived point pair for each key-point pair using the first image 10 and the second image 20 (S106). The generating unit 2060 generates a homography matrix 40 using the key-point pairs and the derived point pairs (S108).

<Regarding First Image 10 and Second Image 20>

The first image 10 and the second image 20 are any photographed images generated by any camera. However, both the first image 10 and the second image 20 contain, at least in part, image regions where the same location is photographed. For example, the first image 10 and the second image 20 are generated by photographing the same building or person from different positions or angles from each other.

<Acquisition of First Image 10 and Second Image 20: S102>

The first detecting unit 2020 acquires a first image 10 and a second image 20 (S102). The first detecting unit 2020 acquires the first image 10 and the second image 20 by any method. For example, the first detecting unit 2020 acquires the first image 10 and the second image 20 from a storage device storing them. Note that the first image 10 and the second image 20 may be stored in the same storage device or different storage devices from each other. Alternatively, the first detecting unit 2020 may acquire the first image 10 and the second image from a camera having generated the first image 10 and a camera having generated the second image 20, respectively.

<Detection of Key-Point Pairs: S104>

The first detecting unit 2020 detects two or more key-point pairs from the first image 10 and the second image 20 (S104). To detect them, the first detecting unit 2020 detects key-points from each of the first image 10 and the second image 20. Here, the key-points to be detected from the first image 10 and the second image 20 can be any type of key-points. In addition, existing techniques can be used to detect key-points from images.

For each key-point detected from the first image 10 and the second image 20, the first detecting unit 2020 computes the feature of the region including the key-point. For example, the feature computed here is a scale-invariant feature such as SIFT, or a feature invariant with respect to affine formation such as Hessian-Affine or Affine-SIFT (hereinafter referred to as an affine-invariant feature). Existing techniques can also be used to compute those features.

The first detecting unit 2020 performs key-point matching between the key-points on the first image 10 and the key-points on the second image 20 using the feature computed for each key-point. In other words, the first detecting unit 2020 associates the key-point on the first image 10 and the key-point on the second image 20 to each other based on the degree of similarity of the features. The key-point on the first image 10 and the key-point on the second image 20 that are associated with each other by the key-point matching can be used as the key-point pair. Note that existing techniques can be used to detect corresponding points from two images by key-point matching.

The first detecting unit 2020 detects any two or more pairs among the pairs of the key-points on the first image 10 and the key-points on the second image 20 as key-point pairs. For example, the first detecting unit 2020 arbitrarily selects one of the key-points detected from the first image 10, and identifies a key-point on the second image 20 that is associated therewith by key-point matching. In other words, the first detecting unit 2020 identifies a key-point on the second image 20 that is sufficiently similar to the feature computed for the key-point extracted from the first image 10 (the degree of similarity of the feature is greater than a threshold), and detects a pair of the identified key-point and the key-point extracted from the first image 10 as a key-point pair. The first detecting unit 2020 detects an arbitrary number of key-point pairs by repeating the processing an arbitrary number of times.

The flow of the processing for detecting key-point pairs is not limited to the flow described above. For example, the first detecting unit 2020 may arbitrarily select one of the key-points detected from the second image 20, and detect the key-point corresponding to the selected key-point from the first image 10 to detect a key-point pair.

<Detection of Derived Point Pairs: S106>

The second detecting unit 2040 detects a derived point pair for each key-point pair (S106). The derived point detected from a key-point on the first image 10 is a point separated by the first distance in the first direction from the key-point on the first image 10. The derived point detected from a key-point on the second image 20 is a point separated by the second distance in the second direction from the key-point on the second image 20.

As described above, the first direction, the first distance, the second direction, and the second distance are determined using features computed for the key-points. As described above, when a scale-invariant feature is used, the first direction is, for example, the principal axis direction of the feature computed for the key-point on the first image 10. Similarly, the second direction is, for example, the principal axis direction of the feature computed for the key-point on the second image 20.

However, the first direction and the second direction may be different from the principal axis direction, as long as each direction is determined based on the principal axis direction. For example, the first direction and the second direction may be the direction opposite to (180 degrees different from) the principal axis direction or the direction rotated by a predetermined angle (for example, +90 degrees) from the principal axis direction.

Here, it is suitable to define the first direction in such a manner that the key-point on the first image 10 in a key-point pair, its derived point, the key-point on the second image 20 in another key-point pair, and its derived point do not pass through the same straight line as each other. This is because, if so, the rectangle formed by the two key-points and the two derived points will degenerate into a straight line.

Therefore, the second detecting unit 2040 may determine, for example, whether the two key-points and the two derived points on the first image 10 are positioned on the same straight line and when they are positioned on a single straight line, the first direction may be changed to detect the derived points again. For example, a detection of the derived points is performed with the initial value of the first direction being set to the principal axis direction. Then, when the two key-points and the two derived points on the first image 10 are positioned on the same straight line, the second detecting unit 2040 shifts the first direction from the principal axis direction by a predetermined direction to detect the derived points again. Note that, existing techniques can be used to determine whether a plurality of points is positioned on a single straight line.

The degeneracy described above can occur on the second image 20 as well. Therefore, it is suitable for the second detecting unit 2040 to detect, in a similar way, the key-points and the derived points from the second image 20 in such a manner that they are not positioned on a single straight line.

As the first distance, a predetermined multiple of the scale size of the feature computed for the key-point on the first image 10 is used. Similarly, as the second distance, a predetermined multiple of the scale size of the feature computed for the key-point on the second image 20 is used. The predetermined multiple used to compute the first distance and the predetermined multiple used to compute the second distance are equal to each other. If the predetermined multiple is 1, the value of the scale is directly used. The example in FIG. 1 shows that the predetermined multiple is 1.

Features are not limited to scale-invariant features and may be affine invariant features. In this case, as the first direction, the direction of a specific axis determined for the feature computed for the key-point on the first image 10 is used, for example. Similarly, as the second direction, the direction of a specific axis determined for the feature computed for the key-point on the second image 20 is used, for example. The specific axis is, for example, the minor axis or the major axis. However, the first direction and the second direction may be the direction opposite to (180 degrees different from) the minor or major axis direction or the direction rotated by a predetermined angle in the minor axis direction or major axis direction. However, the first direction and the second direction are the same type of direction as each other. That is, the second direction is the minor axis direction when the first direction is the minor axis direction, and the second direction is the major axis direction when the first direction is the major axis direction.

As the first distance, a predetermined multiple of the length of the specific axis determined for the feature computed for the key-point on the first image 10 is used. Similarly, as the second distance, a predetermined multiple of the length of the specific axis determined for the feature computed for the key-point on the second image 20 is used. The predetermined multiple used to compute the first distance and the predetermined multiple used to compute the second distance are equal to each other.

The second detecting unit 2040 may detect two or more derived point pairs from one key-point pair. For example, it is assumed that the second detecting unit 2040 detects two derived points from the key-point on the first image 10 included in the key-point pair in a case of using scale-invariant features. In this case, for example, one derived point p11 is defined with "first direction=principal axis direction, and first distance=k1 times the scale", and the other derived point p12 is defined with "first direction=direction opposite to the principal axis, and first distance=k2 times the scale". Here, k1 and k2 may or may not be equal. Similarly, the second detecting unit 2040 detects two derived points from the key-point on the second image 20 included in the key-point pair. Then, one derived point q11 is defined with "second direction=principal axis direction, and second distance=k1 times the scale", and the other derived point q12 is defined with "second direction=direction opposite to the principal axis, and second distance=k2 times the scale". Then, the second detecting unit 2040 detects (p11, q11) and (p12, q12) as the derived point pairs.

In another example, it is assumed that the second detecting unit 2040 detects four pairs of derived points from the key-point on the first image 10 included in one key-point pair in a case of using affine invariant features. In this case, for example, the derived point p11 is defined with "first direction=minor axis direction, and first distance=k1 times the length of the minor axis", the derived point p12 is defined with "first direction=direction opposite to the minor axis direction, and first distance=k2 times the length of the minor axis", the derived point p13 is defined with "first direction=major axis direction, and first distance=k3 times the length of the major axis," and the derived point p14 is defined with "first direction=direction opposite to the major axis direction, and first distance=k4 times the length of the major axis. Here, k1, k2, k3 and k4 may or may not be equal.

Similarly, the second detecting unit 2040 detects four derived points q11, q12, q13, and q14 from the key-point on the second image 20 included in the key-point pair. The derived point q11 is defined with "second direction=minor axis direction, and second distance=k1 times the length of the minor axis", the derived point q12 is defined with "second direction=direction opposite to the minor axis direction, and second distance=k2 times the length of the minor axis", the derived point q13 is defined with "second direction=major axis direction, and second distance=k3 times the length of the major axis", and the derived point q14 is defined with "second direction=direction opposite to the major axis direction, and second distance=k4 times the length of the major axis".

Then, the second detecting unit 2040 detects (p11, q11), (p12, q12), (p13, q13), and (p14, q14) as derived point pairs.

<Generation of Homography Matrix 40: S108>

The generating unit 2060 generates a homography matrix 40 using four or more corresponding point pairs (the key-point pairs and the derived point pairs). Here, existing techniques can be used to compute a homography matrix using four or more corresponding point pairs.

For example, the homography matrix 40 is computed by solving the optimization problem expressed in the following Expression (2).

[Expression 2]

$$\min_{h} \sum \|n \times Hm\| = \|Mh\|^2 \qquad (2)$$
$$\text{s.t. } \|h\|^2 = 1$$

where a vector h is the vector representation of a matrix H, and a matrix M is the coefficient matrix consisting of a vector m and a vector n.

Note that Expression (2) is known to be attributed to the linear least-squares method by using the method of Lagrange multipliers. Then, the Direct Linear Transform (DLT) method or the like can be used for the computation by the linear least-squares method.

Here, instead of directly using the coordinates of each point of the corresponding point pairs, the generating unit 2060 may use normalized coordinates. This can reduce errors in numerical computations. For example, normalization of coordinates involves applying a similarity transformation so that the mean of the coordinate values is zero and the variance is $\sqrt{2}$. When using such normalized coordinate values, the generating unit 2060 can generate the homography matrix 40 by applying the inverse transformation of the similarity transformation to the matrix obtained by the DLT method or the like.

Here, the coordinates of each point of the key-point pairs may be normalized before the derived point pairs are detected. In this case, the second detecting unit 2040 detects the derived point pairs after applying the same transformation to the scale size of a scale-invariant feature or the length of the specific axis of an affine-invariant feature.

<Output of Result>

The homography matrix generation apparatus 2000 outputs information including the generated homography matrix 40 (hereinafter, referred to as output information). The output information is output in any form. For example, the homography matrix generation apparatus 2000 displays the output information on a display device accessible from the homography matrix generation apparatus 2000. Alternatively, the homography matrix generation apparatus 2000 puts the output information into a storage device accessible from the homography matrix generation apparatus 2000, for example. Alternatively, the homography matrix generation apparatus 2000 transmits the output information to other apparatuses that are communicatively connected to the homography matrix generation apparatus 2000, for example.

The output information may include only the homography matrix 40 or may include other information in addition to the homography matrix 40. For example, it is suitable for the output information to also include information indicating that the homography matrix 40 is to be used for the projective transformation from which image to which image. Therefore, the output information includes the identifier of the first image 10 as the identifier of the source image (for example, the file name or the image data itself) and the identifier of the second image 20 as the identifier of the image that is a result of transformation, for example.

<Improvement of Accuracy of Homography Matrix 40>

The homography matrix generation apparatus 2000 may generate a more accurate homography matrix 40 by the following method. The accuracy of the homography matrix 40 here means that, in a case of projecting a point mi on the first image 10 onto the second image 20 using the homography matrix 40, a degree of smallness of the error between a point ci on the second image 20 obtained by the projection and a point ni on the second image 20 that corresponds to the point mi on the first image 10. The smaller the error is, the more accurately the point on the first image 10 is projected to the point on the second image 20 by the homography matrix 40, which means the homography matrix 40 is more accurate.

The homography matrix generation apparatus 2000 generates a plurality of homography matrices 40 by variously changing the corresponding point pairs to be used to generate the homography matrices 40. Then, the homography matrix generation apparatus 2000 selects one homography matrix 40 with highest accuracy among the homography matrices 40, and outputs the output information including the selected homography matrix 40.

Figure 6:
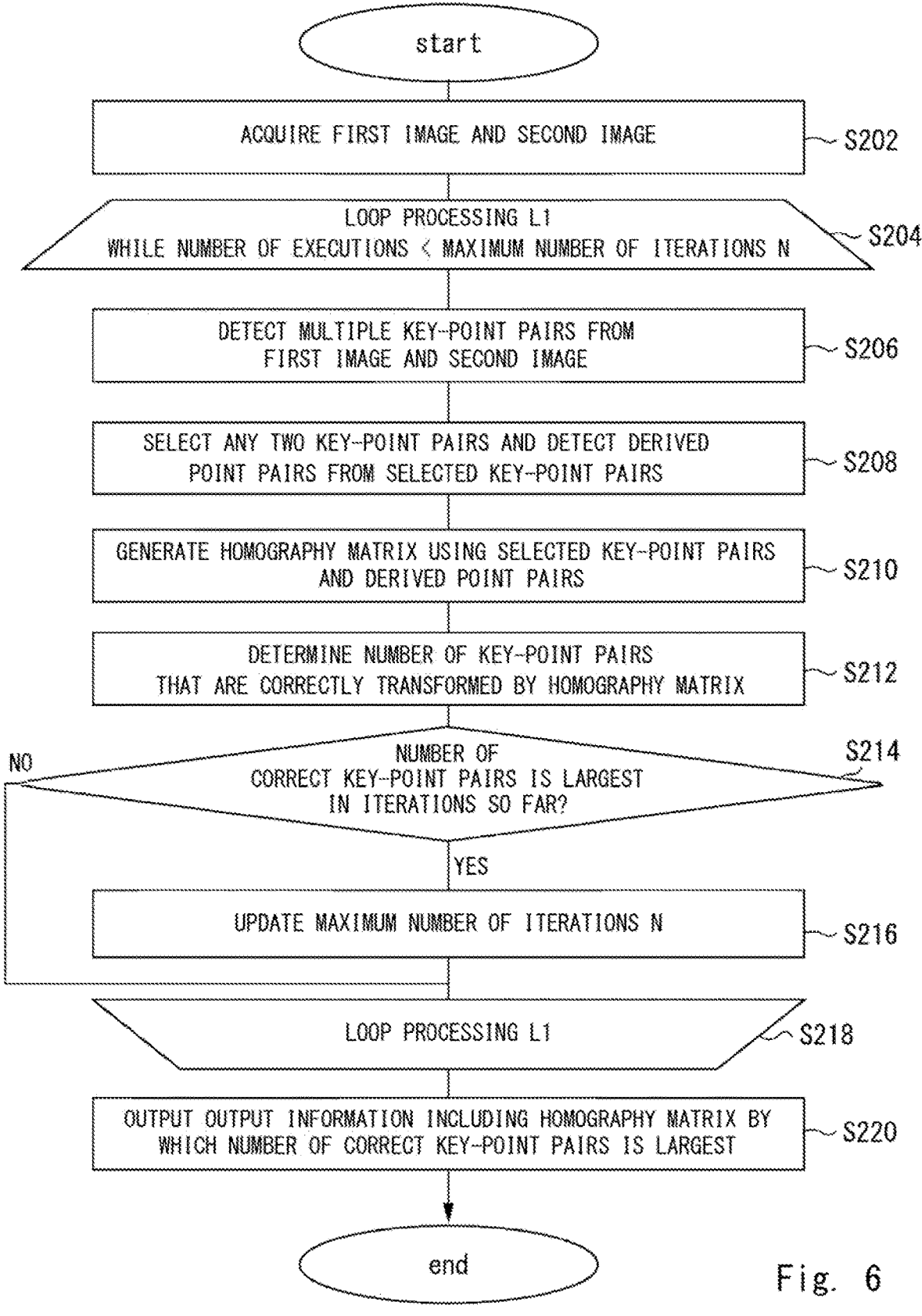
FIG. 6 is a flowchart showing an example of a flow of processing performed by a homography matrix generation apparatus using RANSAC.

For example, the homography matrix generation apparatus 2000 uses RANSAC to generate a highly accurate homography matrix 40. FIG. 6 is an example of a flowchart showing a flow of processing performed by the homography matrix generation apparatus 2000 using RANSAC.

The first detecting unit 2020 acquires a first image 10 and a second image (S202). Then, S204 to S218 is a loop processing L1 that is repeatedly executed until the number of executions of the loop processing L1 reaches the maximum number of iterations N. In S204, the homography matrix generation apparatus 2000 determines whether the number of executions of the loop processing L1 is greater than or equal to the maximum number of iterations N. When the number of executions of the loop processing L1 is greater than or equal to the maximum number of iterations N, the processing in FIG. 6 proceeds to S220. On the other hand, when the number of executions of the loop processing L1 is not greater than or equal to the maximum number of iterations N, the processing in FIG. 6 proceeds to S206.

The first detecting unit 2020 detects a plurality of key-point pairs from the first image 10 and the second image 20 (S206). The second detecting unit 2040 selects any two key-point pairs from the key-point pairs detected in S206 and detects a derived point pair for each of the selected key-point pairs (S208). The generating unit 2060 generates a homography matrix 40 using the two selected key-point pairs and the two derived point pairs detected using them (S210).

The homography matrix generation apparatus 2000 determines, among the key-point pairs detected in S206, the number of key-point pairs that are correctly transformed by the homography matrix 40 (S212). Here, "a key-point pair is correctly transformed by the homography matrix 40" means that, in a case of projecting a point mi on the first image 10 onto the second image 20 using the homography matrix 40, the error between a point ci on the second image 20 obtained by the projection and a point ni on the second image 20 included in the key-point pair is sufficiently small (for example, less than a threshold). Note that the error between the two points is represented by, for example, the length of the distance between them. Hereafter, a key-point pair that is correctly transformed by the homography matrix 40 (a key-point pair in which the above error is less than the threshold) is referred to as a "correct key-point pair", and a key-point pair that is not correctly transformed by the homography matrix 40 (a key-point pair in which the above error is greater than or equal to the threshold) is referred to as an "incorrect key-point pair".

To identify the number of correct key-point pairs, the homography matrix generation apparatus 2000 performs, for each key-point pair: 1) computing the point ci on the second image 20 by performing homography transformation on the point mi on the first image 10 with the homography matrix 40; 2) computing the error between the computed point ci on the second image 20 and the point mi on the second image 20 included in the key-point pair; and 3) determining whether the computed error is less than the threshold. Then, the homography matrix generation apparatus 2000 determines the number of key-point pairs in which the error is less than the threshold (that is, correct key-point pairs).

In S214, the homography matrix generation apparatus 2000 determines whether the number of correct key-point pairs is the largest among the numbers computed in the loop processing L1 that has executed so far. When the number of correct key-point pairs is not the largest among the numbers that has computed so far (S214: NO), the processing in FIG. 6 proceeds to S218. On the other hand, when the number of correct key-point pairs is the largest among the numbers that has computed so far (S214: YES), the homography matrix generation apparatus 2000 updates the maximum number of iterations of the loop processing L1 (S216).

Here, the maximum number of iterations is expressed by, for example, the following Expression (3).

[Expression 3]

$$N = \frac{\log(1-p)}{\log(1-(1-\epsilon)^s)} \qquad (3)$$

where N represents the maximum number of iterations, p represents the probability that there is a key-point pair that is correctly transformed by the homography matrix 40 once in N times, s represents the number of corresponding point pairs used to generate the homography matrix 40 (4 in the previous example), and c is the ratio of incorrect key-point pairs to the total number of key-point pairs.

Here, since the true value of c is unknown, its estimated value is used. Specifically, the homography matrix generation apparatus 2000 uses the largest number of correct key-point pairs computed in the loop processing L1 that has executed so far to perform estimation. When the largest number is expressed as Km and the total number of key-point pairs is expressed as Kall, ε can be estimated as (Kall−Km)/Kall.

Since S218 is the end of the loop processing L1, the processing in FIG. 6 returns to S204.

When the iterative execution of the loop processing L1 is completed, the processing in FIG. 6 proceeds to S220. In S220, the homography matrix generation apparatus 2000 includes, in the output information, the homography matrix 40 generated in the loop processing L1 in which the number of correct key-point pairs is the largest among the homography matrices 40 generated in the loop processing L1 that have executed multiple times and outputs it. In this manner, the homography matrix 40 with the highest accuracy among the generated homography matrices 40 is output.

Here, in the homography matrix generation apparatus 2000 according to the present example embodiment, the number of sample points required for one RANSAC trial (one execution of the loop processing L1 in FIG. 6) is 2 (s=2 in Expression (3)) because the key-point pairs are used to detect the derived point pairs. Therefore, the value of the maximum number of iterations N decreases exponentially compared with a case where 4 sample points are required (s=4 in Expression (3)), as in the invention disclosed by Patent Literature 1. Accordingly, the computational complexity of RANSAC is reduced.

As a method to generate a homography matrix with fewer than four corresponding point pairs, a method using two pairs of scale-invariant key-points is described in Non Patent Literature 1. In the method disclosed by Non Patent Literature 1, a homography matrix is computed by solving the constraints for transforming a scale-invariant key-point into an affine-invariant key-point with higher degrees of freedom.

Since the number of corresponding point pairs is two in the method disclosed by Non Patent Literature 1, the maximum number of RANSAC iterations is equivalent to that in the homography matrix generation apparatus 2000 according to the present example embodiment. However, the homography matrix generation apparatus 2000 according to the present example embodiment has an advantage of reducing the overall computational complexity, compared with the method disclosed by Non Patent Literature 1. For example, the computational complexity required for the processing from selecting key-point pairs to generating the homography matrix 40 is reduced by 20%. In addition, the number of error computations for key-point pairs is reduced to a maximum of ¼.

<Omission of Generation of Homography Matrix 40>

Instead of generating the homography matrix 40 every time in the loop processing L1, the homography matrix generation apparatus 2000 may generate the homography matrix 40 only when a certain condition is satisfied. Specifically, the homography matrix generation apparatus 2000 computes a signed area using the two key-point pairs selected in S206 and the two derived point pairs detected using them. Then, the homography matrix generation apparatus 2000 determines whether to generate the homography matrix 40 based on the correctness of the sign of the signed area. The details are described below.

First, when three-point homogenized image coordinates {x1, x2, x3} are given, the signed area is expressed by the following Expression (4).

[Expression 4]

$$\det(x_1, x_2, x_3) = x_1^T (x_2 \times x_3) \qquad (4)$$

Expression (4) is equivalent to what is called a determinant of a 3×3 matrix. When four corresponding point pairs are given and they are all correct corresponding point pairs, and if any three of the four pairs are selected to compute Expression (4), their signs always have the same sign as each other. For example, it is assumed that the selected key-point pairs are (m1, n1) and (m2, n2), and the derived point pairs detected using them are (p1, q1) and (p2, q2). In this case, for example, if three pairs of (m1, n1), (m2, n2), and (p1, q1) are selected for the computation of the signed areas, det(m1, m2, p1) and det(n1, n2, q1) are computed. Then, if the four corresponding point pairs are all correct, the signs of the two computed signed areas have the same sign as each other.

Figure 7:
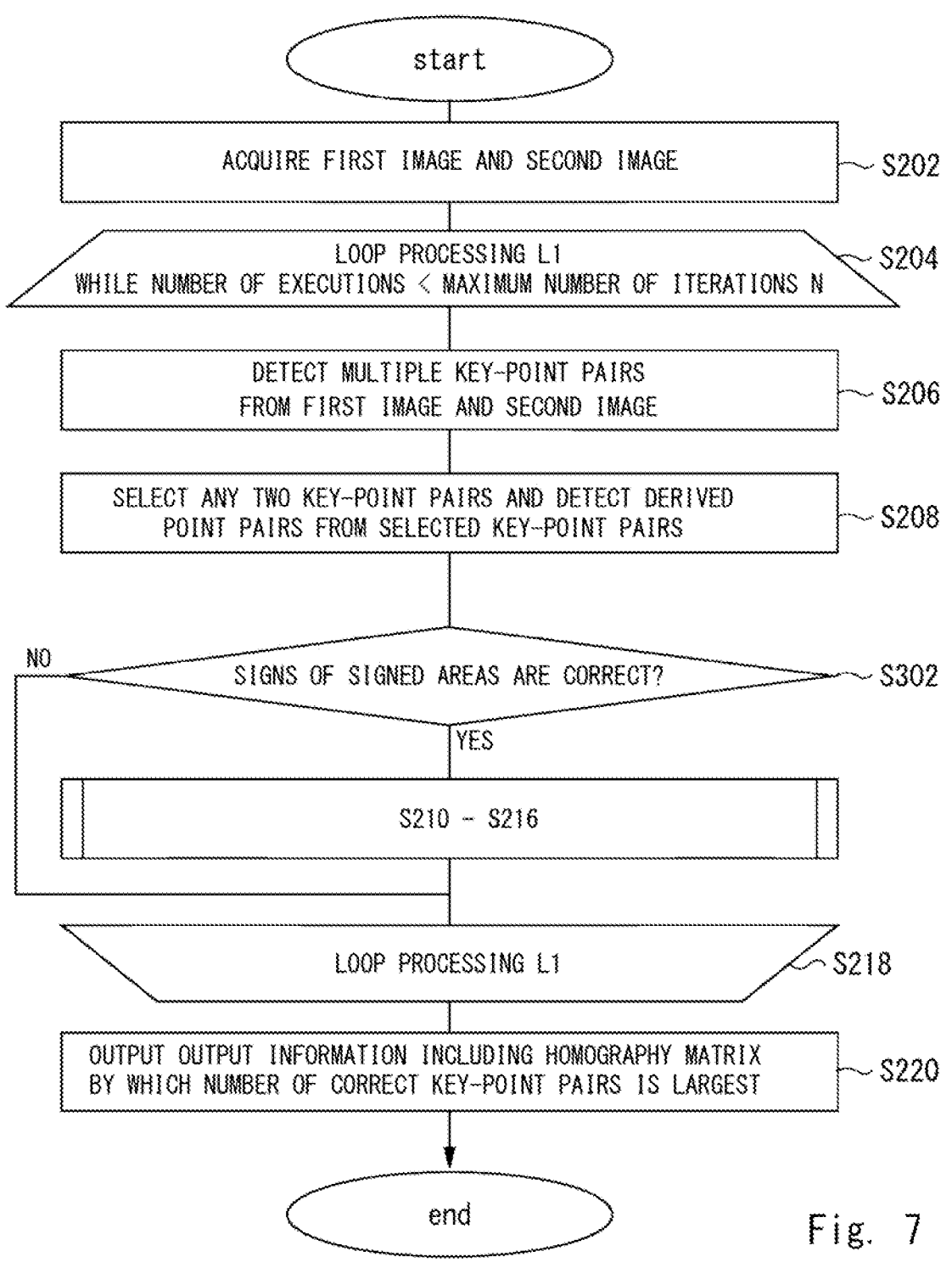
FIG. 7 is an example of a flowchart in which processing of determining whether to generate a homography matrix using a signed area is added to the flowchart in FIG. 6.

Therefore, the homography matrix generation apparatus 2000 selects three corresponding point pairs from the four corresponding point pairs and computes the above signed areas for them to determine whether the signs of the two computed signed areas are equal. When the signs of the signed areas are correct, the homography matrix generation apparatus 2000 executes S210 and subsequent processing. On the other hand, when the signs of the signed areas are not correct, the homography matrix generation apparatus 2000 does not generate the homography matrix 40 and returns to the top of the loop processing L1. FIG. 7 is an example of a flowchart in which the processing of determining whether to generate the homography matrix 40 using the signed areas is added to the flowchart in FIG. 6. The processing of the determination is S302.

Here, when three corresponding point pairs are selected from the four corresponding point pairs, there are four ways of selecting. The homography matrix generation apparatus 2000 computes the signed areas for one or more of these four ways to determine whether the signs are the same as each other. For example, the homography matrix generation apparatus 2000 performs the determination for all the four ways. Then, the homography matrix generation apparatus 2000 generates the homography matrix 40 when the signs of the two computed signed areas are equal to each other in all the cases (determines that the signs of the signed areas are correct in S302).

<Use Other than RANSAC>

The method to improve the accuracy of the homography matrix 40 is not limited to the use of RANSAC. For example, since there are various derivations of RANSAC, they can be selectively combined. For example, when progressive sample consensus (PROSAC) is used, key-point pairs are selected in order of decreasing feature matching scores. In other words, in S208, key-point pairs are not selected randomly but are selected in order of decreasing key-point matching scores (that is, in order of increasing degree of similarity between the features).

Alternatively, locally optimized RANSAC (LO-RANSAC) may be used, for example. In this case, when the number of correct key-point pairs is determined to be the largest in S214 (S214: YES), the processing may be performed by the generating unit 2060 configured to solve Expression (2) using the corresponding point pairs, or a weighted least squares method, such as M-estimator, may be used.

The present invention has been described with reference to the example embodiments, but the present invention is not limited to the above example embodiments. Various changes can be made in the configurations and details of the present invention that can be understood by those skilled in the art within the scope of the present invention.

In the above examples, the program can be stored by various types of non-transitory computer-readable media and provided to a computer. Non-transitory computer-readable media include any type of tangible storage media. Examples of non-transitory computer-readable media include magnetic storage media (such as flexible disks, magnetic tapes, and hard disk drives), optical magnetic storage media (such as magneto-optical disks), Compact Disc Read Only Memory (CD-ROM), CD-R, CD-R/W, Digital Versatile Disc (DVD), and semiconductor memories (such as mask ROM, Programmable ROM (PROM), Erasable PROM (EPROM), flash ROM, and Random Access Memory (RAM)). Tre program may be provided to a computer using any type of transitory computer-readable media. Examples of transitory computer-readable media include electric signals, optical signals, and electromagnetic waves. Transitory computer readable media can provide the program to a computer through a wired communication line (such as electric wires, and optical fibers) or a wireless communication line.

A part or all of the above example embodiments may be described as the following Supplementary notes but are not limited to the following.

(Supplementary Note 1)

A homography matrix generation apparatus comprising:

a first detecting unit configured to detect, from a first image and a second image, two or more key-point pairs each of which is a pair of key-points corresponding to each other;

a second detecting unit configured to detect, for each of the key-point pairs, a derived point pair that is a pair of a point separated by a first distance in a first direction from a point on the first image included in the key-point pair and a point separated by a second distance in a second direction from a point on the second image included in the key-point pair; and a generating unit configured to generate a homography matrix representing a homography from a point on the first image to a point on the second image using each of the detected key-point pairs and the derived point pairs, wherein the first direction and the first distance are determined based on a feature computed for the point on the first image included in the key-point pair, and wherein the second direction and the second distance are determined based on a feature computed for the point on the second image included in the key-point pair.

(Supplementary Note 2)

The homography matrix generation apparatus according to Supplementary note 1, wherein the first direction and the first distance are respectively determined based on a principal axis direction and a scale length of a scale-invariant feature computed for the point on the first image, and wherein the second direction and the second distance are respectively determined based on a principal axis direction and a scale length of a scale-invariant feature computed for the point on the second image, respectively.

(Supplementary Note 3)

The homography matrix generation apparatus according to Supplementary note 1, wherein the first direction and the first distance are respectively determined based on a direction and a length of a specific axis of an affine invariant feature computed for the point on the first image, and wherein the second direction and the second distance are respectively determined based on a direction and a length of a specific axis of an affine invariant feature computed for the point on the second image.

(Supplementary Note 4)

The homography matrix generation apparatus according to any one of Supplementary notes 1 to 3, being configured to repeatedly generate the homography matrix while changing the key-point pairs to be used for detection of the derived point pairs, and to output the homography matrix with highest accuracy of a plurality of the generated homography matrices.

(Supplementary Note 5)

The homography matrix generation apparatus according to any one of Supplementary notes 1 to 4, being configured to extract two points from the key-point pairs and the derived point pairs to compute a signed area, and to determine whether to generate the homography matrix based on a sign of the computed signed area.

(Supplementary Note 6)

A control method to be executed by a computer, the control method comprising:

a first detection step of detecting, from a first image and a second image, two or more key-point pairs each of which is a pair of key-points corresponding to each other;

a second detection step of detecting, for each of the key-point pairs, a derived point pair that is a pair of a point separated by a first distance in a first direction from a point on the first image included in the key-point pair and a point separated by a second distance in a second direction from a point on the second image included in the key-point pair; and a generation step of generating a homography matrix representing a homography from a point on the first image to a point on the second image using each of the detected key-point pairs and the derived point pairs, wherein the first direction and the first distance are determined based on a feature computed for the point on the first image included in the key-point pair, and wherein the second direction and the second distance are determined based on a feature computed for the point on the second image included in the key-point pair.

(Supplementary Note 7)

The control method according to supplementary note 6, wherein the first direction and the first distance are respectively determined based on a principal axis direction and a scale length of a scale-invariant feature computed for the point on the first image, and wherein the second direction and the second distance are respectively determined based on a principal axis direction and a scale length of a scale-invariant feature computed for the point on the second image.

(Supplementary Note 8)

The control method according to supplementary note 6, wherein the first direction and the first distance are respectively determined based on a direction and a length of a specific axis of an affine invariant feature computed for the point on the first image, and wherein the second direction and the second distance are respectively determined based on a direction and a length of a specific axis of an affine invariant feature computed for the point on the second image.

(Supplementary Note 9)

The control method according to any one of Supplementary notes 6 to 8, comprising: repeatedly generating the homography matrix while changing the key-point pairs to be used for detection of the derived point pairs; and outputting the homography matrix with highest accuracy of a plurality of the generated homography matrices.

(Supplementary Note 10)

The control method according to any one of Supplementary notes 6 to 9, comprising: extracting two points from the key-point pairs and the derived point pairs to compute a signed area; and determining whether to generate the homography matrix based on a sign of the computed signed area.

(Supplementary Note 11)

A computer-readable medium storing a program causing a computer to execute:

a first detection step of detecting, from a first image and a second image, two or more key-point pairs each of which is a pair of key-points corresponding to each other;

a second detection step of detecting, for each of the key-point pairs, a derived point pair that is a pair of a point separated by a first distance in a first direction from a point on the first image included in the key-point pair and a point separated by a second distance in a second direction from a point on the second image included in the key-point pair; and a generation step of generating a homography matrix representing a homography from a point on the first image to a point on the second image using each of the detected key-point pairs and the derived point pairs, wherein the first direction and the first distance are determined based on a feature computed for the point on the first image included in the key-point pair, and wherein the second direction and the second distance are determined based on a feature computed for the point on the second image included in the key-point pair.

(Supplementary Note 12)

The computer-readable medium according to Supplementary note 11, wherein the first direction and the first distance are respectively determined based on a principal axis direction and a scale length of a scale-invariant feature computed for the point on the first image, and wherein the second direction and the second distance are respectively determined based on a principal axis direction and a scale length of a scale-invariant feature computed for the point on the second image.

(Supplementary Note 13)

The computer-readable medium according to Supplementary note 11, wherein the first direction and the first distance are respectively determined based on a direction and a length of a specific axis of an affine invariant feature computed for the point on the first image, and wherein the second direction and the second distance are respectively determined based on a direction and a length of a specific axis of an affine invariant feature computed for the point on the second image.

(Supplementary Note 14)

The computer-readable medium according to any one of Supplementary notes 11 to 13, causing the computer to execute a step of: repeatedly generating the homography matrix while changing the key-point pairs to be used for detection of the derived point pairs; and outputting the homography matrix with highest accuracy of a plurality of the generated homography matrices.

(Supplementary Note 15)

The computer-readable medium according to any one of Supplementary notes 11 to 14, causing the computer to execute a step of: extracting two points from the key-point pairs and the derived point pairs to compute a signed area; and determining whether to generate the homography matrix based on a sign of the computed signed area.

REFERENCE SIGNS LIST

10 First image
20 Second image
40 Homography matrix
500 Computer
502 Bus
504 Processor
506 Memory
508 Storage device
510 Input/output interface
512 Network Interface
2000 Homography matrix generation apparatus
2020 First detecting unit
2040 Second detecting unit
2060 Generating unit

What is claimed is:

1. A homography matrix generation apparatus comprising:

at least one memory storing instructions; and at least one processor configured to execute the instructions to:

detect, from a first image and a second image, two or more key-point pairs each of which is a pair of key-points corresponding to each other;

detect, for each of the key-point pairs, a derived point pair that is a pair of a first point and a second point; the first point being separated by a first distance in a first direction from a point on the first image included in the key-point pair, and the second point being separated by a second distance in a second direction from a point on the second image included in the key-point pair; and generate a homography matrix representing a homography from a point on the first image to a point on the second image using each of the detected key-point pairs and the derived point pairs, wherein the first direction and the first distance are determined based on a feature computed for the point on the first image included in the key-point pair, wherein the second direction and the second distance are determined based on a feature computed for the point on the second image included in the key-point pair, and wherein the at least one processor is further configured to extract two points from the key-point pairs and the derived point pairs to compute a signed area, and to determine whether to generate the homography matrix based on a sign of the computed signed area.

2. The homography matrix generation apparatus according to claim 1, wherein the first direction and the first distance are respectively determined based on a principal axis direction and a scale length of a scale-invariant feature computed for the point on the first image, and wherein the second direction and the second distance are respectively determined based on a principal axis direction and a scale length of a scale-invariant feature computed for the point on the second image, respectively.

3. The homography matrix generation apparatus according to claim 1, wherein the first direction and the first distance are respectively determined based on a direction and a length of a specific axis of an affine invariant feature computed for the point on the first image, and wherein the second direction and the second distance are respectively determined based on a direction and a length of a specific axis of an affine invariant feature computed for the point on the second image.

4. The homography matrix generation apparatus according to claim 1, wherein the at least one processor is further configured to repeatedly generate the homography matrix while changing the key-point pairs to be used for detection of the derived point pairs, and to output the homography matrix with highest accuracy of a plurality of the generated homography matrices.

5. A control method to be executed by a computer, the control method comprising:

detecting, from a first image and a second image, two or more key-point pairs each of which is a pair of key-points corresponding to each other;

detecting, for each of the key-point pairs, a derived point pair that is a pair of a first point and a second point, the first point being separated by a first distance in a first direction from a point on the first image included in the key-point pair, and the second point being separated by a second distance in a second direction from a point on the second image included in the key-point pair; and generating a homography matrix representing a homography from a point on the first image to a point on the second image using each of the detected key-point pairs and the derived point pairs, wherein the first direction and the first distance are determined based on a feature computed for the point on the first image included in the key-point pair, wherein the second direction and the second distance are determined based on a feature computed for the point on the second image included in the key-point pair, and wherein the control method further comprises: extracting two points from the key-point pairs and the derived point pairs to compute a signed area; and determining whether to generate the homography matrix based on a sign of the computed signed area.

6. The control method according to claim 5, wherein the first direction and the first distance are respectively determined based on a principal axis direction and a scale length of a scale-invariant feature computed for the point on the first image, and wherein the second direction and the second distance are respectively determined based on a principal axis direction and a scale length of a scale-invariant feature computed for the point on the second image.

7. The control method according to claim 5, wherein the first direction and the first distance are respectively determined based on a direction and a length of a specific axis of an affine invariant feature computed for the point on the first image, and wherein the second direction and the second distance are respectively determined based on a direction and a length of a specific axis of an affine invariant feature computed for the point on the second image.

8. The control method according to claim 5, comprising: repeatedly generating the homography matrix while changing the key-point pairs to be used for detection of the derived point pairs; and outputting the homography matrix with highest accuracy of a plurality of the generated homography matrices.

9. A non-transitory computer-readable medium storing a program causing a computer to execute:

detecting, from a first image and a second image, two or more key-point pairs each of which is a pair of key-points corresponding to each other;

detecting, for each of the key-point pairs, a derived point pair that is a pair of a first point and a second point, the first point being separated by a first distance in a first direction from a point on the first image included in the key-point pair, and the second point being separated by a second distance in a second direction from a point on the second image included in the key-point pair; and generating a homography matrix representing a homography from a point on the first image to a point on the second image using each of the detected key-point pairs and the derived point pairs, wherein the first direction and the first distance are determined based on a feature computed for the point on the first image included in the key-point pair, wherein the second direction and the second distance are determined based on a feature computed for the point on the second image included in the key-point pair, and wherein the program causes the computer to execute: extracting two points from the key-point pairs and the derived point pairs to compute a signed area; and determining whether to generate the homography matrix based on a sign of the computed signed area.

10. The computer-readable medium according to claim 9, wherein the first direction and the first distance are respectively determined based on a principal axis direction and a scale length of a scale-invariant feature computed for the point on the first image, and wherein the second direction and the second distance are respectively determined based on a principal axis direction and a scale length of a scale-invariant feature computed for the point on the second image.

11. The computer-readable medium according to claim 9, wherein the first direction and the first distance are respectively determined based on a direction and a length of a specific axis of an affine invariant feature computed for the point on the first image, and wherein the second direction and the second distance are respectively determined based on a direction and a length of a specific axis of an affine invariant feature computed for the point on the second image.

12. The computer-readable medium according to claim 9, wherein the program causes the computer to execute: repeatedly generating the homography matrix while changing the key-point pairs to be used for detection of the derived point pairs; and outputting the homography matrix with highest accuracy of a plurality of the generated homography matrices.

* * * * *